Patented June 30, 1942

2,288,284

UNITED STATES PATENT OFFICE 2,288,284

COFFEE EXTRACT

John L. Kellogg, Chicago, Ill., assignor, by mesne assignments, to John L. Kellogg & Co., Chicago, Ill., a corporation of Illinois No Drawing. Application January 21, 1941,
Serial No. 375,542

12 Claims. (Cl. 99—71)

This invention relates to the treatment of coffee, de-caffeinized coffee or non-coffee vegetable matter from which coffee-like infusions are made, for example, so-called coffee substitutes, for the purpose of improving the flavor and aroma of the beverages made from such materials (which will be referred to hereinafter collectively as coffee or coffee-like materials); the expedient which constitutes the present invention involving the use of hydrogenated oil, which substance develops, apparently, preserves and holds permanently in the coffee or coffee-like material certain volatiles or other compounds that give the beverages desirable flavors and aromas and, as an anti-oxidant (the preferred substance being of this character) appears to accomplish this result in part at least by checking deterioration of the material by oxidation.

The oil-like substance used may consist of any edible hydrogenated oil which does not in itself detrimentally affect the flavor of the beverage, such for example, as the hydrogenated refined vegetable oils. However, the oil-like substance which is regarded as best for use in connection with the present invention is hydrogenated coffee oil (in the case particularly of the treatment of coffee in distinction to coffee substitutes) in order that the coffee should contain no non-coffee substance.

The object, generally speaking of the invention, is to improve coffee or coffee-like materials by employment of the expedient above described.

A particular object of the invention is to use the above described expedient in connection with the production of coffee extracts (including extracts of de-caffeinized coffee and coffee substitute material); that is to say, to use said expedient in the making of soluble coffee, or coffee-like substances, from which beverages may be made by merely adding water, hot or cold. These coffee extracts have heretofore been found, when made into beverages to be lacking to a greater or less extent in the flavor and aroma characteristic of beverages made directly from the original material, e. g., from the roasted and ground coffee bean. By means of the present invention this defect in coffee extracts has been overcome, particularly when extracting methods are used in accordance with the processes of applicant's co-pending applications, Serial No. 338,876, filed June 5, 1940 (for which Serial No. 412,898, filed September 29, 1941, has been substituted), Serial No. 362,819, filed October 25, 1940, and Serial No. 362,820, filed October 25, 1940; the present application being a continuation in part of said last named application. However, the improvement of the present invention is not to be regarded as limited to any particular method of extraction.

The hydrogenated oil of the present invention may, in the case of the production of coffee or coffee-like extracts be employed in the extraction process at different stages thereof, viz.:

(1) It may be added to the green coffee beans, or other coffee-like material, before roasting.

(2) It may be added to the coffee extract before evaporation.

(3) It may be added to the coffee beans (or other coffee-like material) after roasting and cooling.

(4) It may be added to the coffee beans (or other coffee-like material) hot from the roaster before cooling, grinding and extracting which method is preferred over method 3.

The amount of the hydrogenated oil, preferably hydrogenated coffee oil, will be about 1% by weight of the dry substance coffee. This amount is not critical and may be varied as desired. The hydrogenated oil will tend to prevent other vegetable oils used or developed in the process from becoming rancid.

While, as stated, the improvement of the present invention may be used advantageously in the production of coffee substitute, it has a particular utility in the production of extracts made from coffee itself, because of the fugitive and evanescent character of certain of the constituents of the coffee bean, which when retained and preserved from deteriorating influences give the beverages made therefrom characteristic and desirable flavor and aroma.

The invention is not to be considered as limited to the aforesaid specific applications to practice thereof. The intention is to cover by patent all equivalents and also all modifications within the scope of the appended claims.

The applicant does not claim herein the use of vegetable oils, particularly hydrogenated vegetable oils in the treatment of organic liquids generally for the production of extracts; this being claimed in applicant's co-pending application Serial No. 408,052, August 23, 1941, for "Treatment of organic liquids"; the present invention being limited to the use of hydrogenated edible vegetable oils in connection with the production of beverages or beverage extracts made from coffee, de-caffeinized coffee, or so-called coffee substitutes, which will be referred to herein collectively as "beverages of the coffee type."

I claim:

1. Improvement in the process of making a beverage, of the coffee type, from roasted vegetable material to improve the flavor and aroma of the beverage made therefrom which comprises: mixing with said material a small amount of a hydrogenated edible oil.

2. Treatment of coffee to improve flavor and aroma of the beverage made therefrom which comprises mixing therewith a small quantity of hydrogenated coffee oil.

3. Improvement in the process of making coffee extracts which comprises mixing with the coffee material from which the extract is made a small quantity of a hydrogenated edible vegetable oil.

4. Treatment of coffee to improve the flavor and aroma of the beverage made therefrom which comprises: mixing with the coffee after roasting and while the coffee is still hot a hydrogenated edible oil.

5. Treatment of coffee to improve the flavor and aroma of the beverage made therefrom which comprises: mixing with the coffee after roasting and while the coffee is still hot a hydrogenated coffee oil.

6. Improvement in the process of making a beverage extract of the coffee type from roasted vegetable material which comprises: roasting the material; mixing therewith while still hot a small quantity of a hydrogenated oil; then making an extract from the material and evaporating the extract.

7. Process of making an extract from coffee which comprises: roasting the coffee; mixing therewith a small quantity of hydrogenated coffee oil; and then making an extract from the coffee and evaporating the extract.

8. Process of making an extract from coffee which comprises: roasting the coffee beans; mixing therewith, while still hot, a small quantity of hydrogenated coffee oil; and then making an extract from the coffee and evaporating the extract.

9. Coffee material which contains a small quantity of a hydrogenated edible vegetable oil.

10. Coffee material which contains a small quantity of hydrogenated coffee oil.

11. Improvement in the process of making an evaporated beverage extract of the coffee type from vegetable material which comprises: adding to the extract before evaporation a small quantity of a hydrogenated oil.

12. Improvement in the process of making an evaporated coffee extract which comprises: adding to the extract before evaporation a small quantity of a hydrogenated vegetable oil of a character not to detrimentally affect the flavor of the beverage.

JOHN L. KELLOGG.